United States Patent [19]

Yang et al.

[11] Patent Number: 5,286,458
[45] Date of Patent: Feb. 15, 1994

[54] INJECTION TYPE NON-CATALYST DENITROGEN OXIDE PROCESS CONTROL SYSTEM

[75] Inventors: Shyh-Ching Yang; Jar-Ru Huang; Li-Chiang Chen, all of Hsinchu, Taiwan

[73] Assignee: Industrial Technology Research Institute, Taiwan

[21] Appl. No.: 995,058

[22] Filed: Dec. 22, 1992

[51] Int. Cl.$^5$ .............................................. B01D 53/34
[52] U.S. Cl. .................... 422/168; 422/110; 422/108; 422/111; 422/172
[58] Field of Search ............ 422/168, 108, 111; 423/235

[56] References Cited

U.S. PATENT DOCUMENTS

| | | | |
|---|---|---|---|
| 2,702,080 | 2/1955 | Gee | 422/202 |
| 4,444,060 | 4/1984 | Yamamoto | 73/861.66 |
| 4,473,537 | 9/1984 | Ford, Jr. et al. | 422/111 |
| 4,778,658 | 10/1988 | Nielsen | 422/111 |
| 4,793,268 | 12/1988 | Kukin et al. | 110/345 |
| 4,974,453 | 12/1990 | Hohorst | 73/864.81 |
| 4,976,210 | 12/1990 | Dewald | 110/246 |
| 5,078,973 | 1/1992 | Kuroda | 422/108 |
| 5,103,742 | 4/1992 | Valentino | 422/111 |
| 5,118,282 | 6/1992 | Reynolds et al. | 110/342 |

FOREIGN PATENT DOCUMENTS 5446169 4/1990 Japan .

Primary Examiner—Robert J. Warden
Assistant Examiner—Hien Tran
Attorney, Agent, or Firm—Michael D. Bednarek

[57] ABSTRACT

The present invention relates to an injection noncatalyst denitrogen oxide process control system, in which a reducing agent (such as ammonia), carriers and additional gases are injected into the flue gas of a combustion device. The $NO_x$ in the flue gas will be reduced into nitrogen ($N_2$) and water ($H_2O$). A pressure measurement device and a thermocouple device are installed in an injector for measuring the pressure difference and the temperature of the flue gas respectively, and then be converted into a voltage signal and a thermocouple signal respectively. Both of the signals will be transferred into a controller that is controlled by a computer. The controller can control the flow mass of the reducing agent, carriers and additional gases to the flue gas. Therefore, the reduction reaction of the $NO_x$ can be controlled, thereby maximizing the rate of denitrogen oxide (deNOx) and minimizing the discharge amount of the reducing agent.

7 Claims, 3 Drawing Sheets

INJECTION TYPE NON-CATALYST DENITROGEN OXIDE PROCESS CONTROL SYSTEM

BACKGROUND OF THE INVENTION

The present invention relates to an injection type noncatalyst denitrogen oxide (deNO$_x$) process control system, and in particular to control the amount of denitrogen oxide (deNO$_x$) automatically according to the flue gas conditions of a combustion device.

Environmental preservation has become increasingly important. Nitrogen oxide has been discovered to be the major cause of acid rain. In fact, almost all nitrogen oxides come from burning fossil fuels. As a result, stringent regulations to reduce the allowable emissions of nitrogen oxides are being promulgated in many industrial areas of the world.

The combustion industry is faced with the necessity of having to reduce emissions of nitrogen oxides from its existing units. However, conventional combustion technologies can't meet standards for low NO$_x$ emissions set by such stringent regulations. In order to meet such standards, methods for reducing nitrogen oxides in furnaces have been developed. These methods can be divided into two groups, i.e., the pre-treatment method and the post-treatment method. The pre-treatment method reduces the nitrogen oxides in the flue gas by use of the direct combustion method, i.e., by using the combustion technology of low nitrogen oxide. The post-treatment method reduces the nitrogen oxide to nitrogen by additional reducing agent (such as ammonia, urea) to the already generated flue gas. Examples of the post-treatment method include Selective Catalyst Reduction (SCR) and the Selective Non-Catalyst Reduction (SNCR). The present invention relates to the control system for the SNCR method of post-treatment.

The SNCR method was invented by the Exxon Research and Engineering Co. in 1973. The SNCR method involves injecting ammonia (NH$_3$) into the high temperature flue gas within a temperature range of 870° C. to 1200° C. The NO$_x$ can be reduced to N$_2$ and H$_2$O by selective reaction of NO$_x$ and NH$_3$ during high temperature. The process of reducing NO$_x$ to N$_2$ and H$_2$O requires lower capital investment than the SCR method, whereas the SCR method involves reaction by use of a catalyst at a temperature between 250° C. and 400° C.

The performance of the SNCR method depends on the ratio of NH$_3$ to NO and the temperature during the reaction. The SNCR method consumes more reducing agent and is proved to be more serious ammonia slip than the SCR method, because the SNCR method has a higher ratio of NH$_3$ to NO than the SCR method.

Besides NH$_3$, the SNCR method can also use other reducing agents, such as urea, CH$_3$NH$_2$ and (CHNO)$_3$. The SNCR method can be applied to gas and oil-fired steam boilers, utility boilers, municipal incinerators, oil field steam generators, glass melting furnaces and flue-coke furnaces.

Nowadays, almost all applications of SNCR method involve installing the injection grid within a flue gas at a proper flue gas temperature to inject reducing agent, such as NH$_3$. The reaction occurs after mixing the reducing agent and the flue gas. Location of the injection grid is extremely important so as to achieve optimum performance of denitrogen oxide (deNOx). Unfortunately, the optimum location of adding the SNCR installation in an original system is always limited by its equipment space. In addition, the system may sometimes encounter insufficient reaction temperature during low load operation. Furthermore, rust, corrosive or heavy fouling of the injection grid can easily happen if it directly reacts with the flue gas.

The development of a new SNCR technique employs both an injection grid and a wall injector at the same time. FIG. 1 illustrates a schematic diagram of the prior art for utilizing both an injection grid and a wall injector in an oil-fired steam boiler 1, wherein 11 indicates an injection grid, 12 indicates a wall jet, 13 indicates a primary superheater, 14 indicates a secondary superheater, 15 indicates a reheat superheater, 16 indicates a burner, 17 indicates a flue gas outlet, 18 indicates an air inlet, 19 indicates flue gas flow. The new SNCR technique offers the advantages of high performance, better load following without hydrogen, grid-less injectors and lower capital investment.

However, the above mentioned new SNCR technique still has some disadvantages, i.e., the discharge amount of the reducing agent cannot auto-adjust itself in response to the reaction temperature and the amount of flue gas. The control technique for the SNCR method is substantially more important than that for the SCR method, since the denitrogen oxide (deNO$_x$) rate and the discharge amount of NH$_3$ are affected by the mixing of NH$_3$ and the flue gas, the retention time of NH$_3$, and the reaction temperature. Therefore, the highest rate of denitrogen oxide (deNO$_x$) and the less discharge amount of NH$_3$ can be achieved by controlling the optimum operation conditions.

SUMMARY OF THE INVENTION

It is an object of the present invention to provide an injection type non-catalyst denitrogen oxide (deNO$_x$) process control system.

It is another object of the present invention to provide automatic adjustment of the reducing agent discharge amount in response to the reaction temperature and the amount of flue gas.

It is still another object of the present invention to improve the injection grid problem.

In accordance with the objects of the present invention, there is provided an injection type non-catalyst denitrogen oxide (deNO$_x$) process control system, comprising: an injector installed in the flue gas downstream of a combustion device, the injector comprising an injected pipe, the injected pipe having at least one spray nozzle or at least one injected hole for spraying the mixture of a reducing agent and carriers or at least one additional gas to the flue gas, a pressure measurement device for measuring the pressure difference between the static pressure and the dynamic pressure of the flue gas, the pressure difference is converted into a pressure difference signal, and a thermocouple device for measuring the temperature of the flue gas near the at least one spray nozzle or the at least one injected hole and generating a thermocouple signal according to the temperature of the flue gas near the at least one spray nozzle or the at least one injected hole; a flow mass controller for controlling the flow mass of the reducing agent, the carriers and the at least one additional gas, and sending the reducing agent, the carriers and the at least one additional gas to the injector for spraying through the injected pipe; a pressure transducer for converting the pressure difference signal of the pressure measurement device into a voltage signal; and means for controlling the flow mass controller according to the thermocouple signal and the voltage signal.

The injection type non-catalyst denitrogen oxide (deNOx) process control system of the present invention can be applied to gas, oil or coal-fired steam boilers, utility boilers, municipal incinerators, oil field steam generators, a glass melting furnace and so on.

A cooling device can be added to the injector for protecting the injector against damage caused by the high temperature flue gas.

The injector of the present invention installed with either a horizontal movable type or a horizontal fixed type in the flue gas downstream of the combustion device. In addition, the injector comprising an injected pipe, the injected pipe can have at least one spray nozzle or at least one injected hole for spraying the mixture of a reducing agent and carriers or at least one additional gas to the flue gas. The discharge amount of the reducing agent can auto-adjust itself responsive to the types of combustion device used, the reaction temperature and the amount of the flue gas.

The reducing agent of the present invention can be chosen from ammonia, urea, $CH_3NH_2$, $(CHNO)_3$ and so on. The carriers can be air, steam or inert gases.

BRIEF DESCRIPTION OF THE DRAWINGS

The present invention can be more fully understood by reference to the following description and accompanying drawings, wherein.

DETAILED DESCRIPTION OF THE PREFERRED EMBODIMENTS

Figure 1:
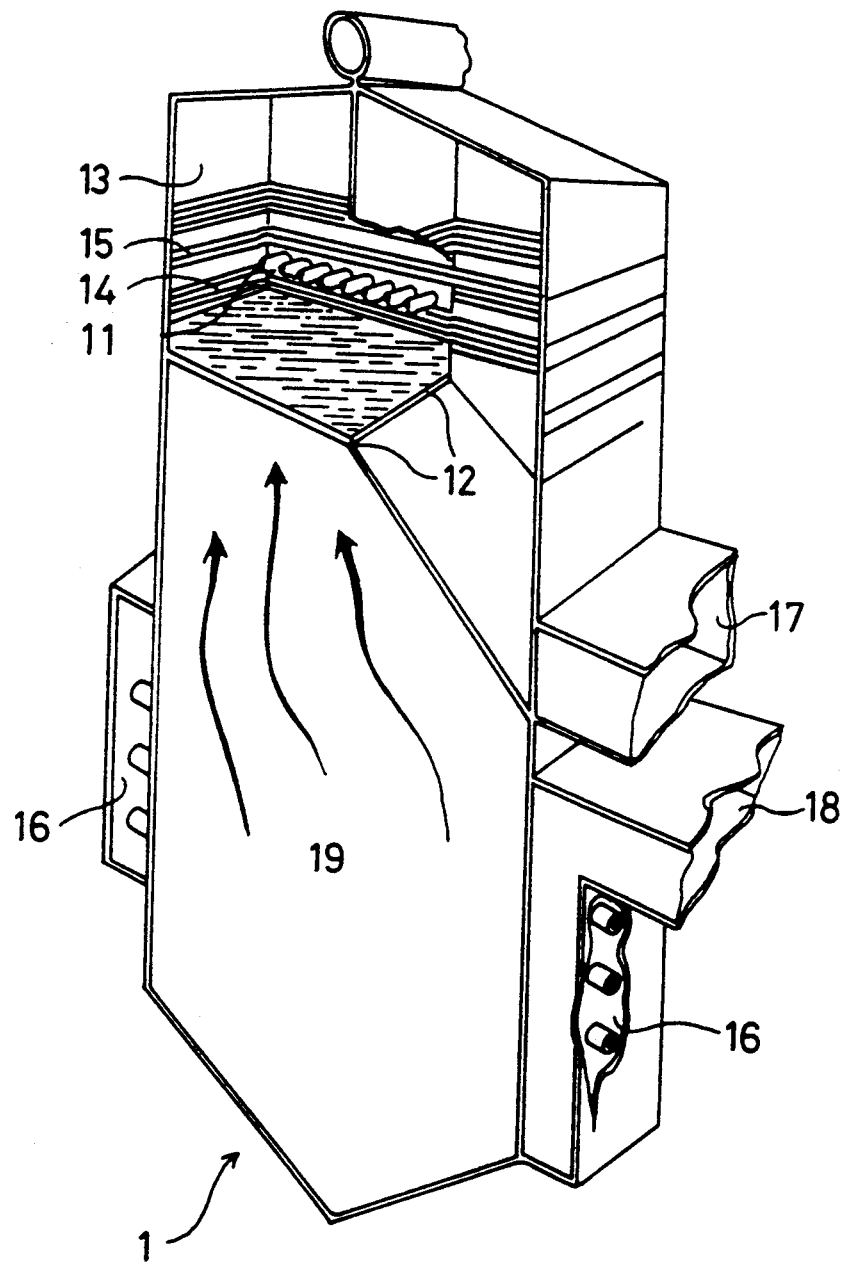
FIG. 1 illustrates a schematic diagram of the prior art for utilizing both an injection grid and a wall injector in an oil-fired steam boiler.
Figure 2:
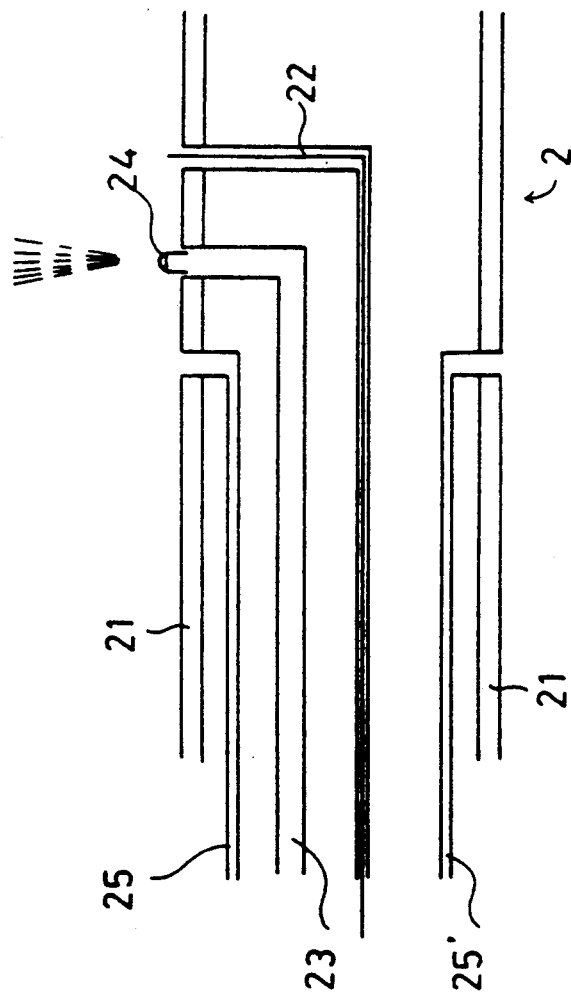
FIG. 2 illustrates a structure diagram of an injection tube of the present invention.

FIG. 2 illustrates a structure diagram of an injector 2 of the present invention. The injector 2 includes a cooling tube 21, in which a cooling water flows within the cooling tube 21 to protect the injector 2 against damage caused by the high temperature flue gas. The injector 2 installs with either a horizontal movable type or a horizontal fixed type in the flue gas downstream of a combustion device. A thermocouple 22 is installed near a spray nozzle 24 to measure the temperature of the flue gas, and then convert the measured value into a voltage signal. 25 indicates a first S-type Pitot tube for measuring the dynamic pressure of the flue gas (i.e., the pressure induced in the flowing gas). 25' indicates a second S-type Pitot tube for measuring the static pressure of the flue gas, (i.e., the pressure existing in an almost still gas flue). The pressure difference between the static pressure and the dynamic pressure can then be obtained for determining the flow velocity of the corresponding flue gas according to well known fluid mechanics principles. 23 indicates a tube for carriers, additional gases or a reducing agent, such as ammonia, to spray through the spray nozzle 24.

Figure 3:
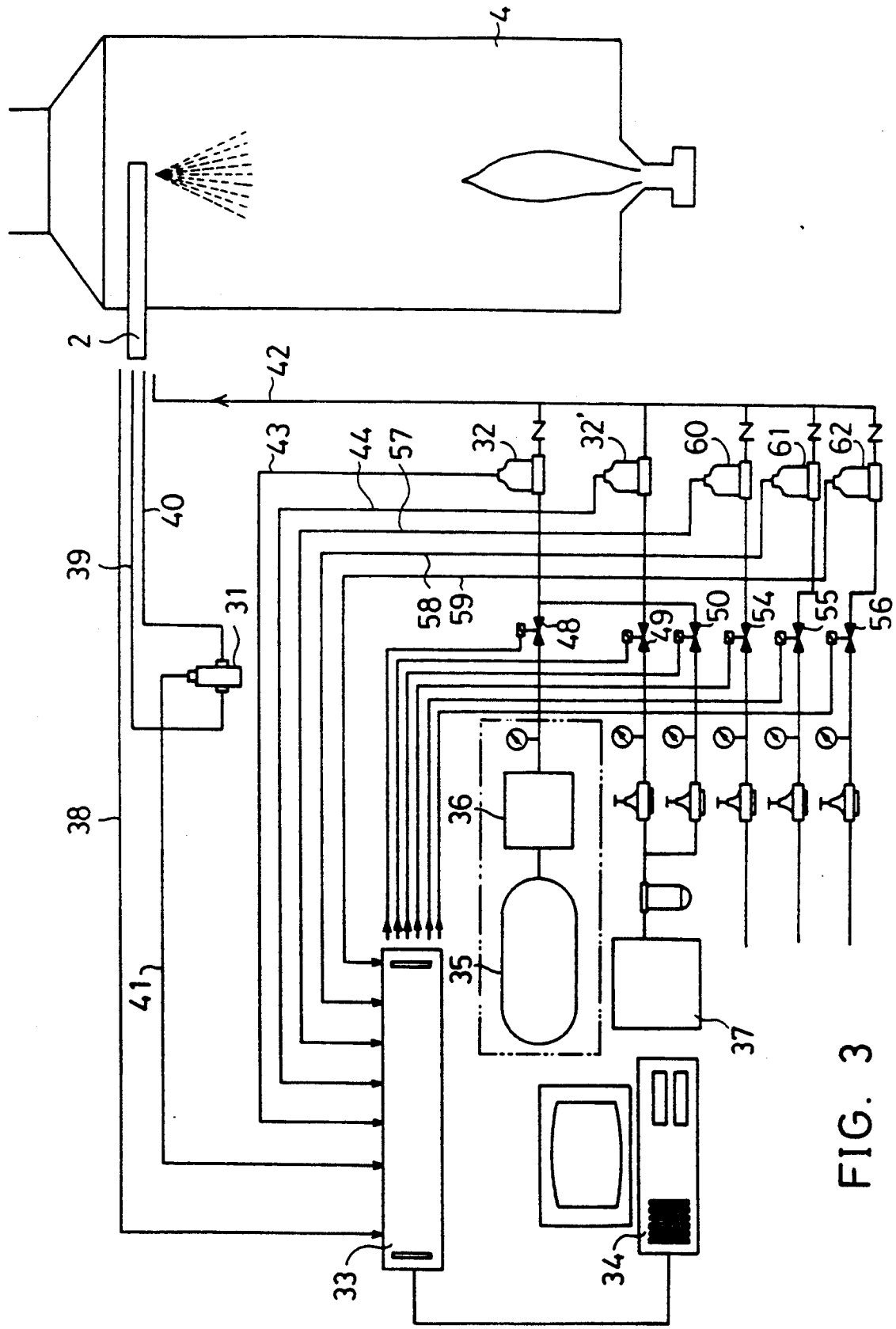
FIG. 3 shows a schematic diagram of a process control system of the present invention.

FIG. 3 shows a schematic diagram of a process control system of the present invention. The injector 2 is installed horizontally in the downstream of a combustion device 4, i.e., near the downstream for producing the flue gas, where the flue gas includes nitrogen oxide ($NO_x$). 31 indicates a transducer for converting the pressure difference between the static pressure and the dynamic pressure transmitted by a tube 39 and a tube 40 respectively, into a pressure difference signal. The pressure signal is then transferred to a signal controller 33 through a tube 41. A first mass flow controller 32 and a second mass flow controller 32' for controlling the mass flow of a reducing agent and the carriers respectively. 35 indicates an ammonia storage tank. 36 indicates an ammonia evaporator. The ammonia is evaporated and passes through a first control valve 48, the first mass flow controller 32, a tube 42 and then to the injector 2. 37 indicates an air carrier source. The carriers pass through a second control valve 49, the second mass flow controller 32', the tube 42 and then to the injector 2 for mixing with the ammonia. There are various additional gases that pass through a third control valve 54, a fourth control valve 55, a fifth control valve 56 and a third mass flow controller 60, a fourth mass flow controller 61, a fifth mass flow controller 62 respectively, and then to the tube 42 for mixing with the ammonia and the carriers. In order to prevent the spray nozzle 24 from being blocked when the flue gas temperature is not sufficiently high enough and not suitable for spraying the reducing agent, air can be send out directly from the air carrier source 37, and pass through a sixth control valve 50, the first mass flow controller 32, the tube 42 and then to the injector 2 for cleaning. 33 indicates a signal controller for receiving the voltage signal comes from a tube 38 and the pressure signal that of the flue gas that comes from the tube 41, and then controlling the first mass flow controller 32 and the second mass flow controller 32' through a tube 43 and a tube 44, and further controlling the mixing ratio of $NH_3$ to air sprayed by the spray nozzle 24 of the injector 2. The signal controller 33 also controls the third, fourth and fifth mass flow controllers 60, 61 and 62, respectively, through electric lines 57, 58 and 59, respectively. The signal controller 33 is controlled by a personal computer 34 with a pre-designed computer program.

By the above mentioned injector and the control system, the discharge amount of the reducing agent can be controlled to maximize the rate of denitrogen oxide (deNOx) and minimize the discharge amount of the reducing agent $NH_3$.

While the invention has been described in terms of what are presently considered to be the most practical and preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. An injection non-catalyst denitrogen oxide process control system for removing nitrogen oxide (NOx) from a flue gas leaving a combustion device, said process control system comprising:

means for spraying a mixture of a reducing agent and carriers or at least one additional gas into a flue gas leaving a combustion device, said spraying means comprising an injector installed in the flue gas leaving said combustion device, said injector including an injected pipe, said injected pipe having at least one spray nozzle or at least one injected orifice for spraying said mixture into the flue gas;

a pressure measurement means provided in said injector for measuring a pressure difference between a static pressure and a dynamic pressure of the flue gas and converting the pressure difference into a pressure difference signal;

a thermocouple means provided in said injector for measuring a temperature of the flue gas proximate said at least one spray nozzle or said at least one injected orifice and generating a thermocouple signal indicative of a temperature of the flue gas proximate said at least one spray nozzle or said at least one injected hold;

a flow mass controlled means for controlling a flow mass of the reducing agent, the carriers or the at least one additional gas and sending the reducing agent, the carriers or the at least one additional gas to said injector for spraying through said injected pipe;

a pressure transducer means for converting the pressure difference signal of said pressure measurement means into a voltage signal indicative of a of the flue gas; and means for controlling said flow mass controller means according to the thermocouple signal and the voltage signal.

2. The injection non-catalyst denitrogen oxide process control system as set forth in claim 1, wherein said injector has a cooling device for cooling said injector.

3. The injection non-catalyst denitrogen oxide process control system as set forth in claim 2, wherein said cooling device is a cooling tube wrapped on said injector.

4. The injection non-catalyst denitrogen oxide process control system as set forth in claim 1, wherein said pressure measurement means is either a S Pitot tube or a double-hole Pitot tube.

5. The injection non-catalyst denitrogen oxide process control system as set forth in claim 1, wherein the reducing agent is selected from the group consisting of ammonia, urea, $CH_3NH_2$ or $(CHNO)_3$.

6. The injection non-catalyst denitrogen oxide process control system as set forth in claim 1, wherein the carriers are an air.

7. The injection non-catalyst denitrogen oxide process control system as set forth in claim 1, wherein said means for controlling said flow mass controller means including a signal controller and a computer with a pre-designed computer program, said signal controller receives the thermocouple signal and the voltage signal for controlling said flow mass controller according to said computer with a pre-designed computer program.

* * * * *